United States Patent [19]

Spotts et al.

[11] 3,969,645
[45] July 13, 1976

[54] SHADED POLE MOTOR

[75] Inventors: Willard Spotts, Boonville; Clifford Brown, Madison, both of Mo.

[73] Assignee: McGraw-Edison Company, Elgin, Ill.

[22] Filed: Nov. 10, 1975

[21] Appl. No.: 630,353

Related U.S. Application Data

[63] Continuation of Ser. No. 494,048, Aug. 2, 1974, abandoned.

[52] U.S. Cl. .............................................. 310/172
[51] Int. Cl.² ...................................... H02K 17/10
[58] Field of Search.... 310/172, 194; 182, 162–165, 310/166, 43

[56] References Cited
UNITED STATES PATENTS

| | | | |
|---|---|---|---|
| 1,823,979 | 9/1931 | Jordan | 310/172 |
| 1,838,122 | 12/1931 | Walter | 310/172 |
| 2,886,722 | 5/1959 | Moelenpah | 310/172 |
| 3,158,769 | 11/1964 | Morrill | 310/172 |
| 3,780,323 | 12/1973 | Swain | 310/43 X |

FOREIGN PATENTS OR APPLICATIONS

| | | | |
|---|---|---|---|
| 759,960 | 10/1956 | United Kingdom | 310/43 |

*Primary Examiner*—Donovan E. Duggan
*Attorney, Agent, or Firm*—Charles F. Lind

[57] ABSTRACT

A shaded pole motor having a shading loop or band that fits with an interference fit adjacent the field plate stack of laminations at the location thereon adjacent the field winding, but having ample clearance space from the stack adjacent the ends of the stack; whereby an epoxy coating can be used to insulate the stack and shading loop from the windings. The shading loop adjacent the ends of the stack further projects well beyond the ends of the stack distances comparable to the breadth of the winding, whereby the winding is mechanically constrained on the stack in part by the shading loop.

11 Claims, 5 Drawing Figures

SHADED POLE MOTOR

This application is a continuation of application Ser. No. 494,048, filed 8-2-71, now abandoned.

BACKGROUND OF THE INVENTION

In a shaded pole motor, there typically are a number of individual magnetic laminations stacked on one another and secured together to define a stator frame having a central opening for receipt of a rotor. The stator is shaped to define a number of circumferentially spaced poles which terminate in radially spaced relationship to the rotor and the poles have windings thereon formed by a wire wound around the pole which must be insulated from adjacent turns of the wire and from the laminations. The adjacent windings are connected typically in a crossing fashion to simultaneously generate opposite polarity when connected to an alternating current power source, and the number of poles determines the operating rotor speed. For alternating with 60 cycle altnerating current a 2 pole motor would operate at approximately 3,600 rpm; a 4 pole motor would operate at approximately 1,800 rpm, and a 6 pole motor would operate at approximately 1,200 rpm. A shunting conductor or shading loop is typically located near one end of each pole face and delays the magnetic buildup along the face, thereby providing a unidirectional rotation to the rotor. The rotor is typically without any windings but is fabricated of a conductive material having its surface periphery formed as axially extended and separated raised land areas and grooves.

In such shaded pole motors, one form of insulation used is a paper-like sleeve or form which is rested against the laminations of the stator and projected beyond the ends of the stator, and the field wire is wound around these insulating sheets and is thereby maintained separated from the stator. This necessitates a minimum given clearance between the winding and the stator, such as a quarter of an inch, so that the diameter of the winding must be approximately half an inch larger than the width of the stator plates.

There currently are epoxy coatings which can be adhered to the field stack, and the Underwriters Laboratories (UL) approves this type insulation if there exists a minimum thickness of approximately five thousandths of an inch (0.005 inch) on the flat and/or on the corners. The field winding can be wound directly over the coated field plate stack thereby reducing the size and cost of the winding coil, where the same wire is used with the same number of turns, as compared to the stator noted above.

This epoxy coating typically does not operate satisfactorily where the shading loop is located, since exterior cracks or gaps form between the shading loop and the back face of the field stack and between the shading loop and windings to reduce the effectiveness of the insulation below acceptable standards. Epoxy coating typically is not successful to close internal cracks, since even though it might appear full and continuous after a period cracks or pin hole breaks appear. If a very thick layer of epoxy is laid over the area of the shading loop, this increased cost of the epoxy nearly always offsets any decrease in the winding costs.

Many processes are available for coating motor parts with epoxy, but few are successfully used with shaded pole motors. It is possible, for example, to electrostatically charge the motor field plate stack and the fine powdered epoxy with opposite polarity and to apply the powder uniformly onto the stack in any number of ways, such as by exposure in a cloud chamber created by bubbling air through a bed of powder, or by various spraying techniques using venturi draw from a powder bed. After the motor stack is so powder coated any area where fine tolerance is required, such as on the inner and outer faces of the stack or in bolt holes, the same can be vacuumed clean. The powder coated stack is then heated in an oven to an appropriate temperature for a proper duration to set or cure the epoxy. It is also possible to coat the motor parts heated already to the setting temperature, where the particular powder epoxy is applied to the heated stack much in the same manner as noted above, but any area that is to remain uncoated must be masked first before exposure to the powder.

It should be noted that one of the pecularities of coating with an epoxy by almost any known technique is that the epoxy does not cover small cracks or interior areas effectively since there is a tendency for voids and the like to appear even after the coating is heat set.

By contrast, the epoxy can be applied quite uniformly over continuous or tightly innerfitting shallow corners even on adjacent members, or can fill in rather large gaps or voids effectively. In a sense, this invention utilizes this particular characteristic of the epoxy for improving the very nature of epoxy covered motors, and can be understood and appreciated more completely by referring to the detailed description of the invention which follows.

Specific prior art patents which might be of some assistance in teaching the various aspects mentioned above include: Walters U.S. Pat. No. 1,838,122; Moehlenpah U.S. Pat. No. 2,886,722; Jordon U.S. Pat. No. 1,823,979; Morrill U.S. Pat. No. 3,158,769; Swain U.S. Pat. No. 3,780,323; and the Great Britain Pat. 759,960.

SUMMARY OF THE INVENTION

This invention relates to a particular cooperation of the field plate stack to and with the shading loop so as to allow for the successful and economical insulation of the stack with an epoxy coating while yet complying with the UL standards. Further, this invention relates to the shading loop construction that additionally allows for the mechanical holding of the field winding, thereby offering greater durability to the motor.

The invention provides for a slot opening to the pole face which defines a tapered cantilevered shading loop receiving projection with the narrow part adjacent the rotor. The shading loop is formed from a single piece copper plate that is stamped to give an elongated central opening bounded by opposed side legs and opposed end heads. The side legs are counterturned to allow positioning of the shading loop onto the tapered projection with the leading edge of the inwardly positioned leg in tightly abutting contact with the tapered projection. The shading loop opening is longer by some than the full width of the field stack so that the shading loop is well spaced from the endmost laminations of the field stack. The opposed end heads project beyond the ends of the stack distances comparable to the breadth of the winding to mechanically hold the winding in place of the pole.

DETAILED DESCRIPTION OF THE INVENTION

Figure 1:
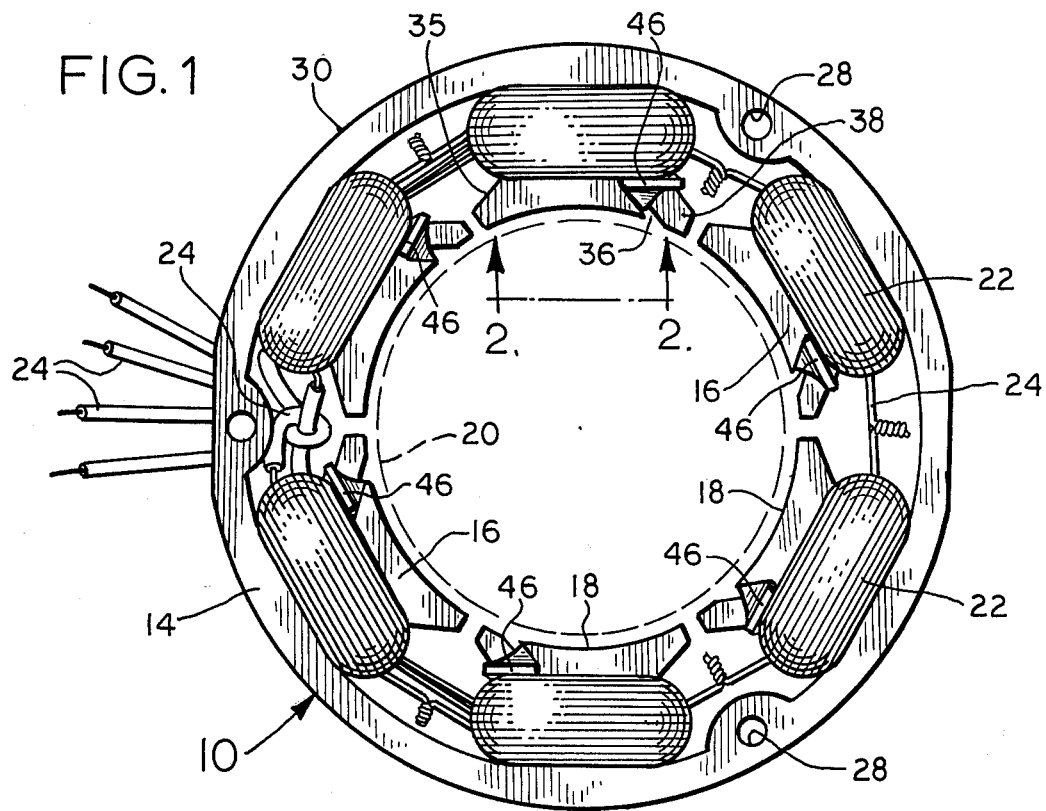
FIG. 1 is a front elevational view showing a typical six pole field plate stator arrangement, incorporating a preferred embodiment of subject invention.
Figure 2:
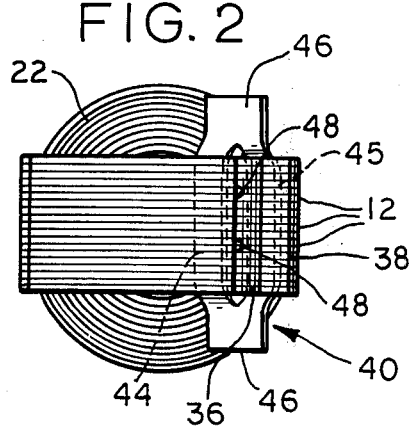
FIG. 2 is a view as seen generally from line 2—2 in FIG. 1 showing an individual pole innerface and the field winding associated therewith.

Referring to FIGS. 1 and 2, the disclosed field plate assembly 10 is comprised of a plurality of annular separate laminations 12 which are stacked together and held in place by rivets or the like (not shown) as a field plate stack 14. The stack shown includes an annular band 15 and six separate inwardly directed pole elements 16 separated circumferentially from one another and having inner pole faces 18 which together define a generally cylindrical opening within which a rotor (shown in phantom as 20) is adapted to be mounted. Each pole 16 has a winding 22 about it, and the winding leads 24 are connected in a crossing and straight fashion with leads of the adjacent windings and ultimately to the end leads 26 for connection to the controls for the motor. In this circuit, the adjacent poles are simultaneously generating opposite north-south magnetic fields when subjected to an alternating current, and this polarity constantly shifts during the normal fluctuation of the current through the windings. Openings 28 in the field plate stack 24 are provided for mounting the field plate within end bells (not shown), and similarly the outer peripheral surface 30 of the stack generally fits snuggly with the end bells and the assembly is thereby firmly held in place.

Figure 3:
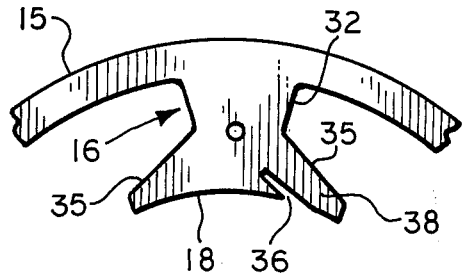
FIG. 3 is a side elevational view of an improved pole configuration of the field plate, before the winding or shading loop has been fixed in place.
Figure 4:
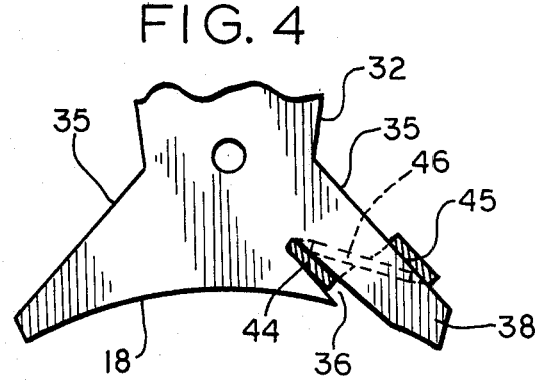
FIG. 4 is a view somewhat similar to FIG. 3, except showing the shading band in place.

Referring now to FIG. 3, the general construction of each pole 16 is disclosed and projects inwardly from the annular band 15 across a narrow neck 32 and generally symetrical diverging shoulders 35 to terminate at the curved pole face 18. A slot 36 of appropriate uniform width is formed in the pole face 18 adjacent one end of the same and extends upwardly at an angle toward the neck portion and this thereby defines with the shoulder 35 a pole projection or tip 38. The pole projection is tapered slightly, approximately 5° for example, from its narrowest point at the pole face and the taper is generally uniform along its length.

Figure 5:
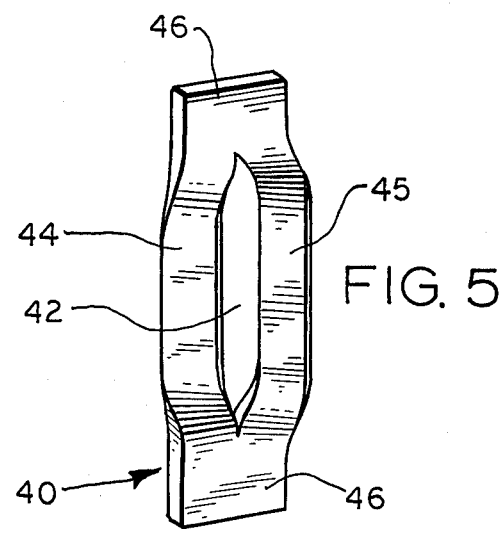
FIG. 5 is a perspective view of the shading band used in the particular motor.

FIG. 5 shows a shading loop or band 40 which is typically formed or shaped from a flat rectangular piece of a conductive material such as copper. The band has an opening 42 punched in the center to define opposed legs 44 and 45 straddling the sides of the opening and opposed enlarged end heads 46. The legs are further twisted in opposite directions from the normal plane of the non-formed band and from the opposite end heads, although the legs remain generally parallel to one another, to where the outer edge of the legs are only slightly displaced from or are even generally in line with the plane through the end heads 46 while the inner edges of the legs are displaced substantial distances and to opposite sides respectively of the plane between the end heads.

Each shading band 40 is adapted to be fitted over the respective pole projections 38, and in this regard the opening 42 is substantially greater in length between the opposite heads 46 than the width or thickness of the stack 14; whereas conversely, the distance between the inner edges of the legs 44 and 45 is approximately equal to the narrow part of the pole projection 38. The leg 44 fits in the slot 36 and the leg 45 rides on shoulder 35, and the shading band then is biased upwardly away from the pole face. Because of the tapered pole tip 38 and the close initial fit of the shading loop on the tip, such positioning urges the leading edge of leg 45 adjacent the winding tightly against the shoulder 35 of the pole projections 38. The shading band can then be mechanically held in place on the pole projection by staking over at 48 part of the laminations at the slot 38 against the shading band.

As positioned, the leading edge of the winding side leg of the shading band is tight against the shoulder 35 of the pole projection, and the same can thus be readily covered with epoxy for effective insulation; whereas the band opposite ends of the opening 42 are well spaced from the endmost laminations of the stack, and this likewise can receive the epoxy for effective insulation. In like manner, the traling edge of the winding side leg of the shading band is typically spaced well above the shoulder face of the pole projection, and this too is readily filled with the epoxy to provide good insulation.

It is appreciated that after the shading band or loop 40 has been fixed in place on each of the respective poles, the stack can be covered with the epoxy in any of the manners previously noted. After the stack has been coated with epoxy, the windings 22 are wound by acceptable commercial machines, as is common in the art, and are connected as noted to form the field plate stator assembly 10. At this time, the stator assembly can be varnish impregnated in any known manner, if such is desired according to the end purpose of the motor.

Another important feature of this invention is that the projected end heads 46 of the secured shading band 40 project normally beyond the field stack to the extent comparable to the width or breadth of the windings, and serve thereby to hold each winding in place mechanically; and this increases the durability of the stator assembly.

We claim:

1. In a shaded pole motor having a stator stack formed of annular magnetic laminations defining circumferentially spaced pole projections with respective pole faces which outline a central rotor space, each pole projection having a narrow slot inclined upwardly from corresponding ends of the pole face and forming thereby a pole tip cantilevered toward the pole face, and an electrically conductive continuous loop shading band having an opening fitting over the pole tip, the improved combination of having each pole tip tapered to the narrowest at the pole face and the shading band having spaced side legs and spaced end heads defining said band opening and the side legs being spaced apart across the opening a distance less than the thickness of the pole tip thereby necessitating a wedging interference fit thereof particularly along an exposed edge contact area crosswise to the stack against the pole tip upon complete positioning of the band on the pole tip and the end heads being spaced apart across the opening a distance significantly more than the thickness of the stack to leave a discernible air gap under the shading band at each endmost stack lamination even upon complete positioning of the band on the pole tip, and epoxy coating selectively on the pole projections and shading band and specifically bridging over said edge contact area and further specifically over each endmost lamination and under the shading band at each endmost stack lamination in the location of the air gap and thereby independently covering the shading band and stack at the air gap and effectively thereby electrically insulating the band and the stack, field coil means wound on each pole projection over the epoxy coating and, wherein the end heads project beyond the endmost stack laminations distances comparable to the breadth of the field coil means on the pole projection, serving thereby to mechanically hold the former in place.

2. In a shaded pole motor having a stator stack formed of annular magnetic laminations defining circumferentially spaced pole projections with respective pole faces which outline a central rotor space, each pole projection having a narrow slot inclined upwardly from corresponding ends of the pole face and forming thereby a pole tip cantilevered toward the pole face, and an electrically conductive continuous loop shading band having an opening fitted over the pole tip, the improved combination of having each pole tip tapered to the narrowest at the pole face and the shading band having spaced side legs and spaced end heads defining said band opening and the side legs being spaced apart across the opening a distance less than the thickness of the pole tip thereby necessitating a wedging interference fit thereof against the pole tip upon complete positioning of the band on the pole tip and the end heads being spaced apart across the opening a distance significantly more than the thickness of the stack to leave a discernible air gap under the shading band at the endmost stack laminations, an epoxy coating selectively on the pole projections and shading bands insulating the same electrically, and field coil means wound on each pole projection over the epoxy coating, the end heads projecting beyond the endmost stack laminations distances comparable to the breadth of the field coil means on the pole projection, serving thereby to mechanically hold the former in place and wherein at least part of the stack laminations adjacent the slot formed therein is stacked over against the positioned shading bands, thereby mechanically holding the shading band in place relative to the stack.

3. In a shaded pole motor having a stator stack formed of annular magnetic laminations defining circumferentially spaced pole projections with respective pole faces which outline a central rotor space, each pole projection having a narrow slot inclined upwardly from corresponding ends of the pole face and forming thereby a pole tip cantilevered toward the pole face, and an electrically conductive continuous loop shading band having an opening fitted over the pole tip, the improved combination of having each pole tip tapered to the narrowest at the pole face and the shading band having spaced side legs and spaced end heads defining said band opening and the side legs being spaced apart across the opening a distance less than the thickness of the pole tip thereby necessitating a wedging interference fit thereof against the pole tip upon complete positioning of the band on the pole tip and the end heads being spaced apart across the opening a distance significantly more than the thickness of the stack to leave a discernible air gap under the shading band at the endmost stack laminations, an epoxy coating selectively on the pole projections and shading bands insulating the same electrically, and field coil means wound on each pole projection over the epoxy coating, the shading band being formed of a flat generally rectangular blank of material, where the opening is punched or formed therein and the side legs straddling the opening are countertwisted in opposite directions generally from alignment with the end heads, and thereby defining a leading side leg and a trailing side leg on, to the positioning of the band of the pole tip, the leading side leg being adapted to be positioned in the slot and the trailing side leg being adapted to be positioned on the face of the pole tip adjacent the field coil means, the slot being uniform in width throughout its entire length and being only slightly larger than the cross section of the leading side leg, and the taper of the pole tip being small of the order of approximately 5°, the stator in the area adjacent the slot being staked over against the band mechanically holding the band in the slot, and further the end heads projecting beyond the endmost stator laminations distances corresponding generally to the buildup of the field coil means on the pole projection, whereby the field coil means are in part held on the pole projection by abutment directly against the shading band.

4. In a shaded pole motor having a stator stack formed of annular magnetic laminations defining circumferentially spaced pole projections with respective pole faces which outline a central rotor space, each pole projection having a narrow slot inclined upwardly from corresponding ends of the pole face and forming thereby a pole tip cantilevered toward the pole face, and an electrically conductive continuous loop shading band having an opening fitted over the pole tip, the improved combination of having each pole tip tapered along its entire length to the narrowest at the pole face and the shading band having spaced side legs and spaced end heads defining said band opening and the side legs being spaced apart across the opening a distance less than the thickness of the pole tip thereby necessitating a wedging interference fit thereof particularly along an exposed edge contact area crosswise to the stack against the pole tip upon complete positioning of the band on the pole tip and the end heads being spaced apart across the opening a distance significantly more than the thickness of the stack to leave a discernible air gap under the shading band at each endmost stack lamination even upon complete positioning of the band on the pole tip, an epoxy coating selectively on the pole projections and shading bands and specifically bridging over said edge contact area and further specifically over each endmost stack lamination and under the shading band at each endmost stack lamination in the location of the air gap and thereby independently covering the shading band and stack at the air gap and effectively thereby electrically insulating the band and the stack, and field coil means wound on each pole projection over the epoxy coating.

5. A shaded pole motor combination according to claim 4, wherein the taper on the pole tip is small and is of the order of approximately 5°.

6. A shaded pole motor combination according to claim 5, wherein the slot is uniform in width throughout its entire length.

7. A shaded pole motor combination according to claim 4, wherein the shading band is formed of a flat generally rectangular blank of material, where the opening is punched or formed therein and the side legs straddling the opening are countertwisted in opposite directions generally from alignment with the end heads, and thereby defining a leading side leg and a trailing side leg relative to the positioning of the band of the pole tip.

8. A shade pole motor combination according to claim 7, wherein the leading side leg is adapted to be positioned in the slot and the trailing side leg is adapted to be positioned on the face of the pole tip adjacent the field coil means.

9. A shaded pole motor combination according to claim 8, wherein the slot is uniform in width throughout its entire length and is only slightly larger than the cross section of the leading side leg, and the taper of the pole tip is small of the order of approximately 5°.

10. A shaded pole motor combination according to claim 9, wherein the leading and trailing side legs are generally parallel to one another.

11. In a shaded pole motor having a stator stack formed of annular magnetic laminations defining circumferentially spaced pole projections with respective pole faces which outline a central rotor space, each pole projection having a narrow slot inclined upwardly from corresponding ends of the pole face and forming thereby a pole tip cantilevered toward the pole face, an electrically conductive continuous loop shading band having an opening fitted over the pole tip, insulation means selectively on the pole projections and shading bands insulating the same electrically, and field coil means wound on each pole projection over the insulation means, the improved combination of the shading band having spaced side legs and spaced end heads defining said band opening, one of the side legs being adapted to be positioned in the slot and the other of the side legs being adapted to be positioned on the face of the pole tip adjacent the field coil means and the end heads projecting beyond the endmost stator laminations distances corresponding generally to the buildup of the field coil means on the pole projection, whereby the field coil means are in part held on the pole projection by abutment directly against the shading band, and means cooperating between the stator and band mechanically holding the band in the slot.

* * * * *